(12) United States Patent
Cornfield et al.

(10) Patent No.: US 11,203,127 B2
(45) Date of Patent: Dec. 21, 2021

(54) ROTARY-TYPE CUTTING IMPLEMENT

(76) Inventors: Randall Cornfield, Montreal (CA); Miodrag Jankovic, Montreal (CA)

(*) Notice: Subject to any disclaimer, the term of this patent is extended or adjusted under 35 U.S.C. 154(b) by 0 days.

(21) Appl. No.: 10/443,615

(22) Filed: May 23, 2003

(65) Prior Publication Data

US 2004/0231475 A1 Nov. 25, 2004

(51) Int. Cl.
*B26B 25/00* (2006.01)
*A21C 15/04* (2006.01)

(52) U.S. Cl.
CPC ............ *B26B 25/005* (2013.01); *A21C 15/04* (2013.01); *Y10T 83/04* (2015.04)

(58) Field of Classification Search
CPC ..... B26B 25/005; B26B 25/00; B26B 25/002; B26B 25/007; A21C 5/00; A21C 11/106; A21C 15/04; B23D 57/0015
USPC .... 83/292, 295, 306, 307, 316, 319; 30/292, 30/295, 306, 307, 316, 319, 130, 294, 30/301, 302, 314, 315, 317, 329, 340, 30/342, 380, 376, 388–391, 276; D7/694
See application file for complete search history.

(56) References Cited

U.S. PATENT DOCUMENTS

| | | | | |
|---|---|---|---|---|
| 252,268 | A * | 1/1882 | Silcott | 83/490 |
| 609,213 | A * | 8/1898 | Ridgely | 30/292 |
| 733,511 | A * | 7/1903 | Ridgely | 30/292 |
| 775,434 | A * | 11/1904 | Williams | 30/292 |
| 1,584,630 | A * | 5/1926 | Meighan | 30/381 |
| 1,955,063 | A * | 4/1934 | Greitzer | 30/380 |
| 2,490,255 | A * | 12/1949 | Chase | 30/371 |
| 2,526,154 | A * | 10/1950 | Parks | 30/307 X |
| 2,711,761 | A * | 6/1955 | Grants | 30/380 |
| 3,590,483 | A | 7/1971 | Szczepanski | |
| 3,621,894 | A * | 11/1971 | Niksich | 30/380 |
| 4,020,550 | A | 5/1977 | Okada | |
| 4,413,414 | A * | 11/1983 | Strzalka | 30/380 |
| 4,432,137 | A | 2/1984 | Okada | |
| 4,738,028 | A | 4/1988 | Belokin et al. | |
| D304,276 | S | 10/1989 | Wolff et al. | |
| 4,907,789 | A | 3/1990 | Tice | |
| 5,101,564 | A | 4/1992 | Melter | |
| D330,665 | S | 11/1992 | Neuendorf | |
| 5,220,729 | A * | 6/1993 | Gallant | 30/380 |
| 5,299,355 | A * | 4/1994 | Boda et al. | 30/292 X |
| D352,426 | S | 11/1994 | Tucker | |
| 5,369,886 | A * | 12/1994 | Gallatin | 30/371 |
| D355,815 | S | 2/1995 | La Gro | |

(Continued)

FOREIGN PATENT DOCUMENTS

| | | |
|---|---|---|
| BE | 1013992 | 1/2003 |
| GB | 2 264 224 | 8/1993 |

(Continued)

*Primary Examiner* — Clark F Dexter
(74) *Attorney, Agent, or Firm* — Isidore PLLC

(57) ABSTRACT

A cutting implement including an annular blade defining a central blade aperture and a circular cutting edge. The annular blade is rotatably mounted in a handle covering a covered arc segment of the blade while allowing an outer arc segment of the blade to protrude from the handle. The device may be held through the use of a palm grip wherein some of the fingers of the user are inserted through the blade aperture and press the handle against the palm of the hand. A mechanism may be provided for selectively restraining the rotation of the blade relative to the handle.

20 Claims, 11 Drawing Sheets

(56) References Cited

U.S. PATENT DOCUMENTS

| | | | |
|---|---|---|---|
| 5,388,334 A * | 2/1995 | Halsey | 30/509 |
| 5,428,898 A | 7/1995 | Hawkins | |
| 5,504,998 A | 4/1996 | Nyugen | |
| D375,662 S | 11/1996 | Noga | |
| D381,564 S | 7/1997 | Kolada | |
| 5,711,077 A | 1/1998 | Schultz et al. | |
| D397,001 S | 8/1998 | Antista et al. | |
| 6,094,824 A | 8/2000 | Takeshita | |
| 6,359,239 B1 | 3/2002 | Missler et al. | |
| 6,371,470 B1 | 4/2002 | Ward | |
| D460,338 S | 7/2002 | Martelli | |
| 6,438,850 B2 | 8/2002 | Young et al. | |
| 6,643,936 B2 * | 11/2003 | Carlson et al. | 30/292 X |
| 2002/0095804 A1 | 7/2002 | Coplan | |
| 2004/0049924 A1 | 3/2004 | Robinowitz et al. | |

FOREIGN PATENT DOCUMENTS

| | | |
|---|---|---|
| JP | 52 130089 | 11/1977 |
| JP | 56 013976 | 2/1981 |

\* cited by examiner

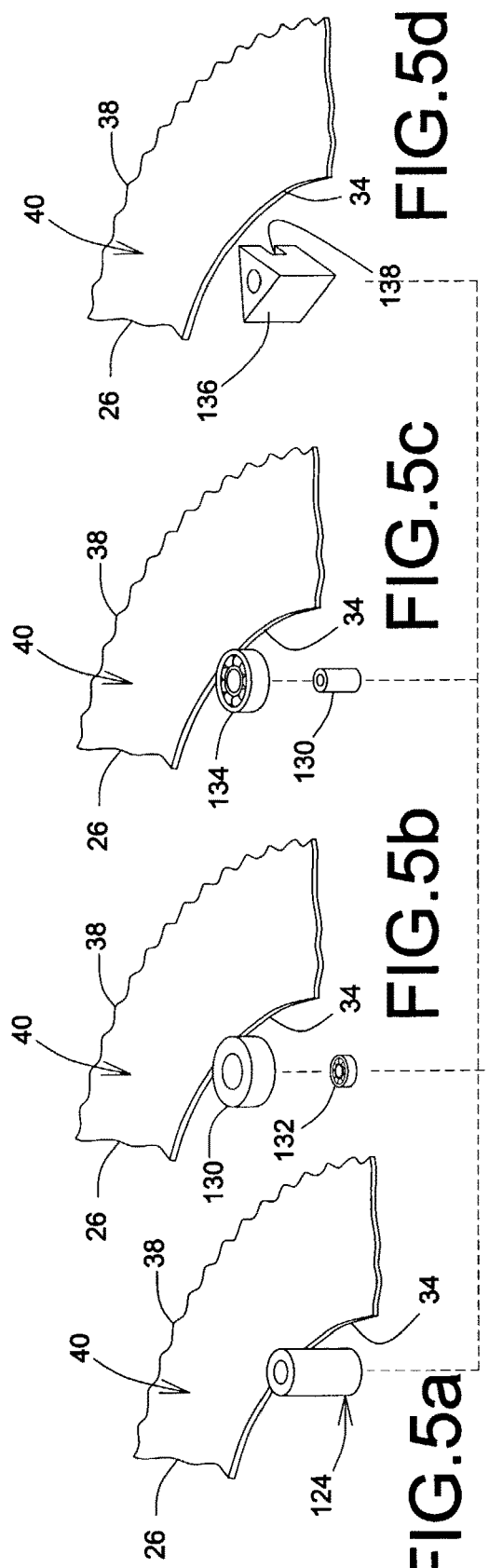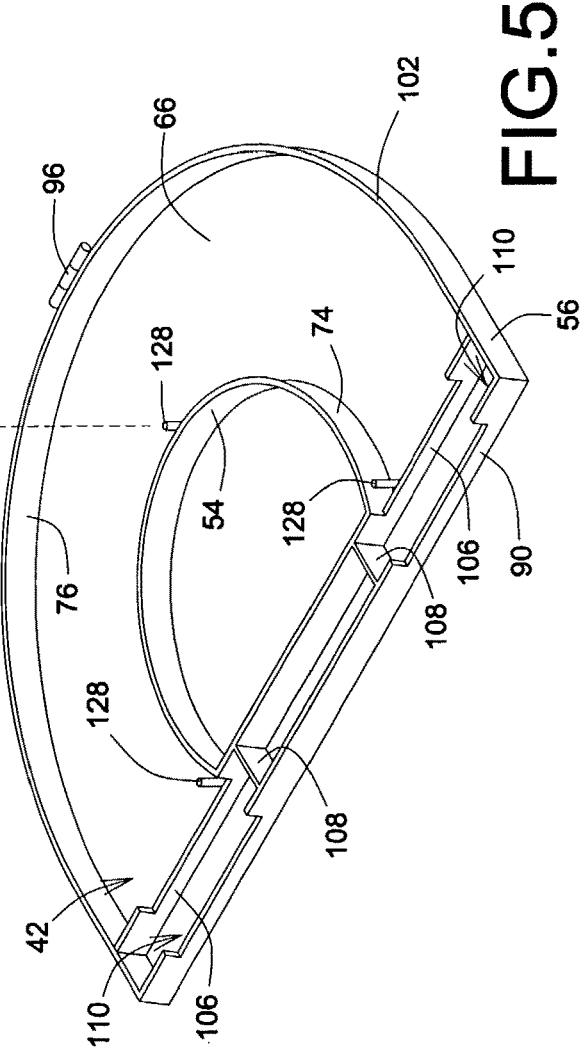

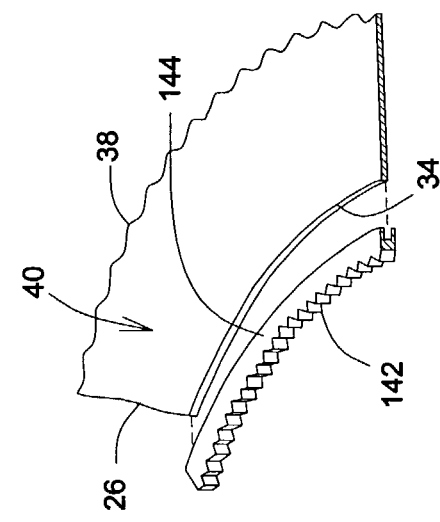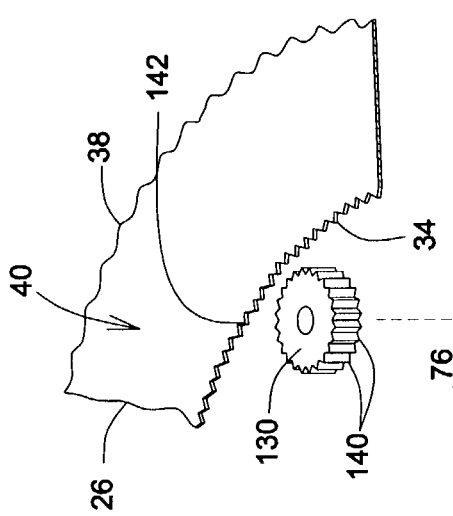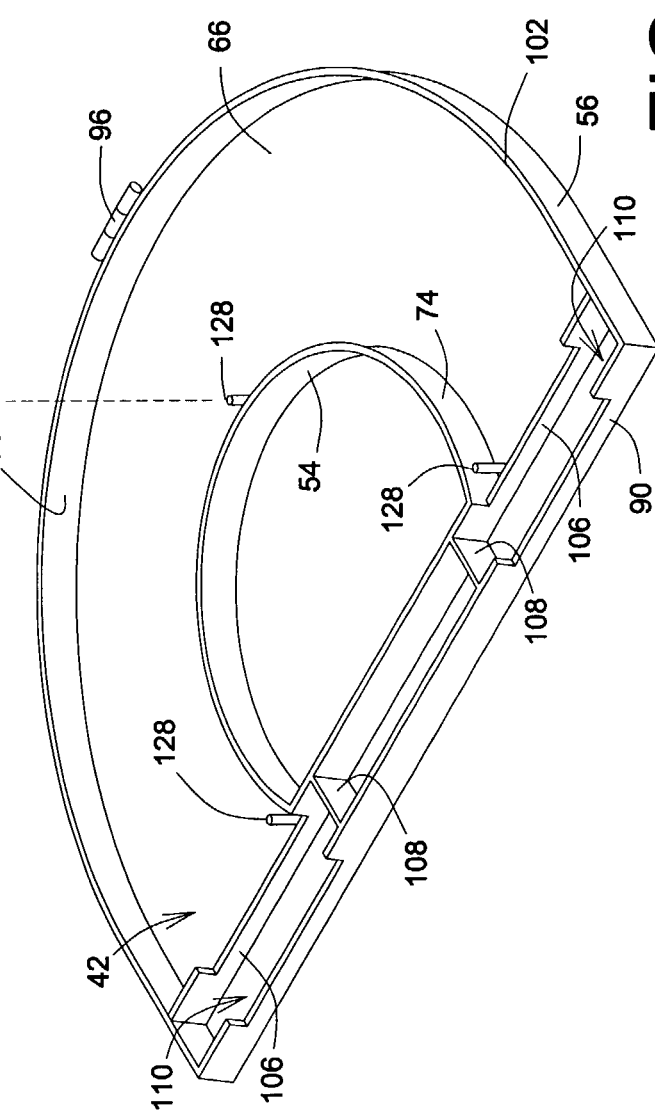

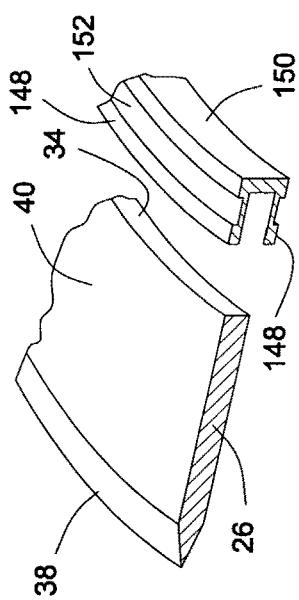
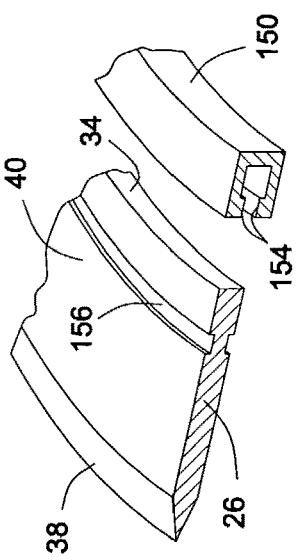
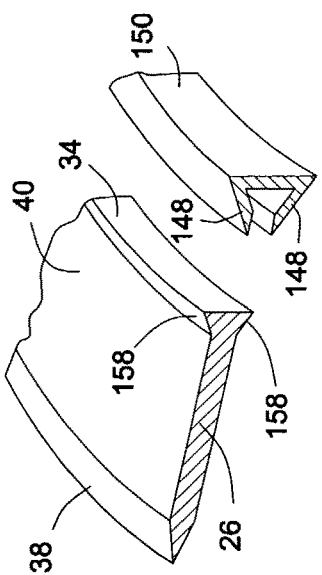
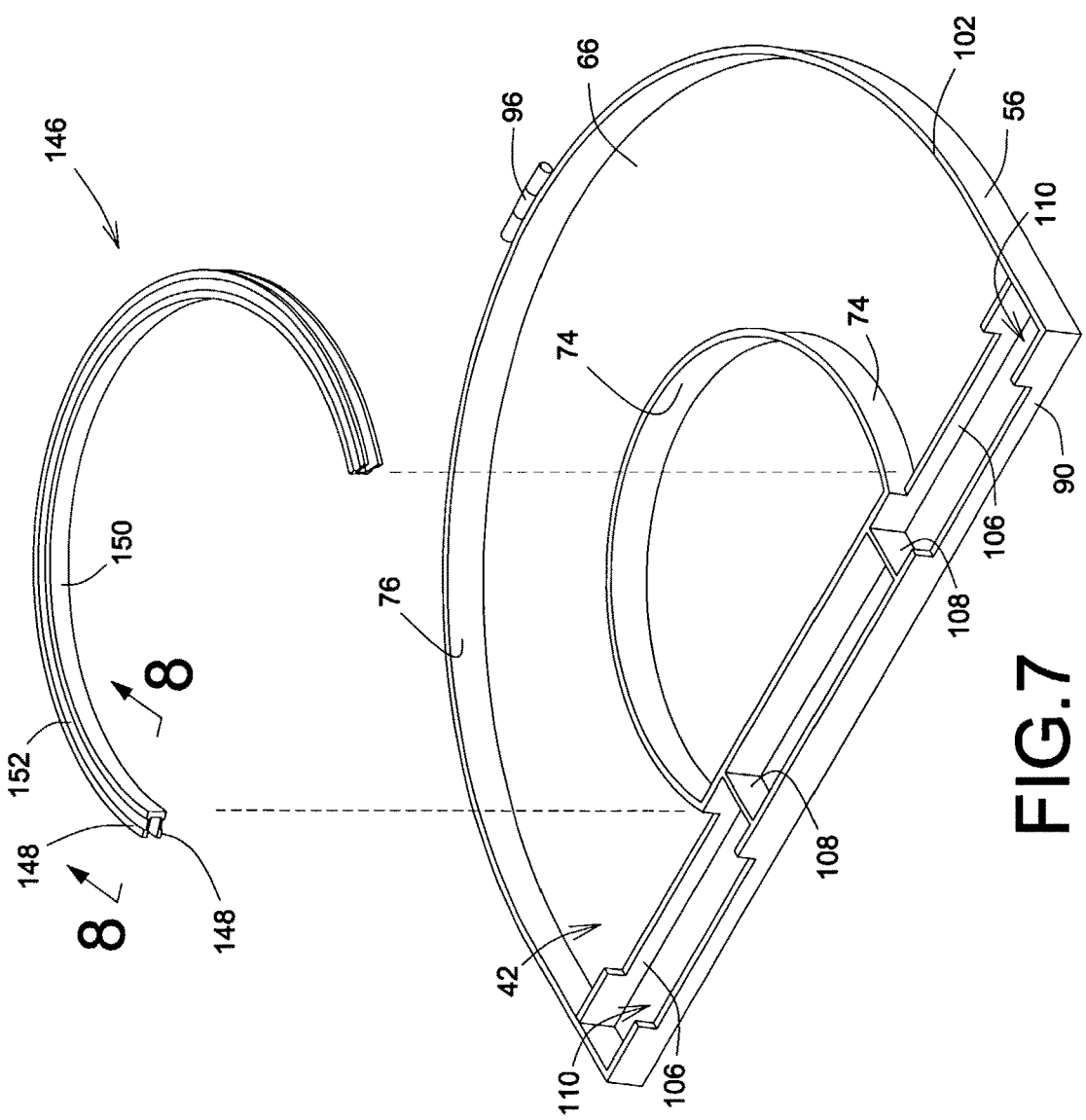

ROTARY-TYPE CUTTING IMPLEMENT

FIELD OF THE INVENTION

The present invention relates to the general field of cutting implements and is particularly concerned with a cutting implement having a rotary blade.

BACKGROUND OF THE INVENTION

There exists a plurality of situations wherein it is desirable to manually cut objects. A sub-set of such situations includes various operations performed using various types of knives during the processing or preparation of various types of food products. Throughout the following disclosure, the present invention is mostly disclosed, by way of example, as being used for cutting foodstuff. It should however be understood that the present invention could also be used in numerous other contexts and applications wherein a rotary-type knife is suitable such as for cutting vitreous, ceramic or other types of objects.

Some of the numerous shapes and styles of knives commonly used in the kitchen environment include French Chef's knives, Chinese Chef's knives, paring knives, slicing knives, utility knives, bread knives, hand knives, cook's knives, cleaver knives, boning knives, filet knives, clam/oyster knives, mezzaluna knives and pizza knives. Most of these knives use a generally elongated blade fixedly extending from a handle. Such knives typically sever food products through a sawing-like action.

So-called pizza knives or rotary-type knifes or cutters, however, typically include a rotary blade rotatably attached to a handle adjacent a longitudinal end thereof by an axle allowing rotation in a plane generally perpendicular to the surface being cut. During use of such knives, a user grasps the handle and presses the peripheral cutting edge of the rotary blade against the material to be cut.

As the rotary blade is rolled under pressure, the material is severed in the path traced by the rotary blade. The amount of pressure to be applied to the blade for accommodating various consistencies and thicknesses of objects is typically varied by modifying the angle at which the handle is positioned relative to the material being cut.

By way of example, pizza knives are typically used for diametrically cutting pizzas, pies, various types of dough and the like several times into pie shaped sections prior to serving the latter. It is well known that the crust and/or contents of the pizza or pie, particularly when hot, make it difficult to perform the cutting operation due to the consistency of the crust and/or contents.

When knives having a stationary elongated blade are used with a sawing action, the cutting action tends to drag the filling and, hence, spoil the appearance of the pizza for serving. This problem is compounded adjacent the central area of the pizza pie where all the cuts intersect.

Conventional pizza knives using a rotary blade rotatably attached to a handle at least partially solve the hereinabove mentioned drawbacks associated with conventional knives using a stationary elongated blade. Indeed, the rolling action, changes the dynamic interaction and the direction of the frictional force between the cutting blade and the foodstuff. These modifications, in turn, prevent at least partially, pizza or pie contents such as the topping from being pulled along the cutting path.

Although the prior art rotary-type cutters have proven to be somewhat satisfactory in certain specific settings they nevertheless suffer from numerous drawbacks. One major problem associated with conventional rotary-type cutters is that the cutting blades are often mounted so as to be unstable under the pressure applied thereon during cutting.

Often, the thickness and size of prior art rotary blades as well as the size and position of the handle of prior devices limit the amount of force that can be applied during cutting. Also, with most prior art rotary-type cutters, the blade is free to wobble from side to side during the cutting process, reducing efficiency and potentially producing an uneven cut. Indeed, such conventional blade designs typically contend with the competing objectives of allowing free rotation of and giving suitable support for the rotary blade.

In some instances, a higher degree of accuracy in straightness and perpendicularity of the cut surface are required. To meet this requirement, it is necessary to form a slit that is sufficiently smooth, straight and deep. To form a deep slit, the cutting blade has to penetrate deeply into the product to be cut. Most conventional rotary-type cutters have proven to be unsuitable for performing deep slits because of their inability to sustain hard pressure exerted thereon.

Furthermore, the location of the rotary cutter blade of conventional rotary-type cutters limits the size of the wheel being used. Hence, most conventional rotary-type cutters are provided with a relatively small cutting blade having a diameter in the range of two inches. This, in turn, further precludes the ability of the rotary-type cutter to perform deep slits.

Another problem associated with most prior art rotary-type cutters is that the elongated handles of such conventional cutters and the position of the rotary blade relative to the handle require that the intended user grasp the handle firmly in often non-ergonomic positions. In particular, the positioning of the blade precludes ergonomical use of prior art rotary-type cutters as the cutting motion by hand-wise movement therewith is often clumsy especially during rapid stroking thereof.

Positioning of the cutting wheel at a distal end of a handle of conventional rotary-type cutters also increases the moment of inertia when the direction of the cutting wheel needs to be changed. This, in turn, leads to increased strain on the hand and wrist of the intended user. Also, the configuration and position of the handle of such prior devices limit the amount of force that can be ergonomically applied during cutting, often requiring the user to exert added energy to make a single cut.

Constant repetition of the same hand or wrist actions, particularly in an non-ergonomical position, can strain and inflame nerves and muscles as well as tendons (tenosynovitis, tendonitis) and/or cause severe wrist pains (for example as with carpal tunnel syndrome). Because the musculo-skeletal strain from repeatedly flexing the wrist when applying arm-wrist-finger force does not cause observable injuries, it often takes months or years for users such as workers working in high volume kitchens to detect damages that may be difficult to heal.

Prior art rotary-type cutters are not only susceptible of causing repetitive stress-type of injuries but may also potentially cause overt-type of injuries. Indeed, the configuration of most prior art rotary-type cutters is such that the hand of the intended user grasping the handle may easily slip down the handle towards the cutting blade and unwillingly contact the latter.

Furthermore, most prior art rotary-type cutters fail to provide a shield for protecting the fingers of the intended user from the blade. Hence, the fingers of the intended user may contact the blade potentially causing a serious injury thereto. The problem is compounded in situations wherein the handle is slippery due to contact with contextual food products such as sauces, toppings, cheese, flour and dough.

Also, most conventional pizza cutters fail to provide a shield of some type for preventing the hand of the intended user from contacting the pizza or other foodstuff. This may cause a messy situation and may even lead to a burning injury. This problem is compounded in situations wherein the angle between the handle and the pizza is relatively small.

Most prior art rotary-type cutters eventually further suffer from problems associated with wear or damage to their cutting blade. Since smaller wheels are used, each segment of the cutting edge is used more often for a given cutting action leading to accelerated wear of the cutting edge. Also, most prior art rotary-type cutters fail to provide a means of protecting the cutter edge against dulling when not in use.

Problems associated with damaged blades are compounded by the fact that most conventional prior art rotary cutters are provided with cutter blades that are permanently mounted to the handle. Hence, they do not allow for easy replacement of the cutter blade leading, in turn, to a decreased life cycle of the cutting implements since the implement must often be discarded in the event that the blade becomes dulled or otherwise damaged.

Also, the design of most prior art pizza cutters and, in particular, the type of mechanical attachment of the cutting wheel to the handle often precludes adequate hygienic cleaning of the cutting device sometimes leading to potentially unsanitary conditions.

Most prior art rotary-type cutters further suffer from a lack of versatility. Indeed, notwithstanding the herein above-mentioned drawbacks, although some prior art rotary-type cutters have proven to be somewhat satisfactory when used to slice standard thin crust pizzas, most have proven to be unsatisfactory for other varieties of available pizzas including so-called "pan", "stuffed" and "deep dish" pizzas. For example, most prior art devices have proven to be awkward and clumsy to use particularly with pizzas having a thicker crust or a thicker layer of toppings such as stuffed and pan pizzas at least in part because of the relative instability of the blades relative to the handles.

Furthermore, in instances wherein the foodstuffs, such a pizza or pie, is baked in a pan of either the shallow or deep type, conventional rotary-type cutters are often ineffective to completely separate the pieces at the corners where the bottom of the pan joins the sides. Indeed, because of the diameter of most conventional rotary type cutting implements is relatively small, difficulty may be encountered in cutting a close-fitting pizza crust right up to the edge of a pan in which it is prepared.

In this event, spatulas or other serving tools may be too limber or unsuitably configured to reach into the pan corners and, hence, another household utensil such as an elongated blade knife needs to be employed in order to completely separate the pizza pieces at the corners. The sawing action of conventional knives is also often better suited to cut the edges of the pizza crust where the cheese becomes tougher than that of the pizza body.

Hence, in order to properly sever individual pieces from a pizza or pie, up to two types of knives are needed when conventional rotary-type cutters are used. Accordingly, the two conventional utensils must be cleaned, leading to an increased workload. Furthermore, these two utensils must be stored individually thus leading to an increased required storage space. Furthermore, the risk of misplacing at least one of the two utensils is also increased. Also, since two types of knives are used sequentially, there exists an increased risk of being unintentionally injured by the blade of one of the knives.

It would thus be desirable to provide a single utensil that can be used for cutting various sections of foodstuffs having different consistencies such as a single utensil that can be used for cutting the crust edges, the corner and body parts of a pizza.

The prior art as shown at least one patent attempting to circumvent at least some of the hereinabove mentioned drawbacks associated with most conventional rotary-type cutters. U.S. Pat. No. 6,438,850 naming Michael W. K. Young et al. as inventors, issued Aug. 27 2002, discloses a roller cutter having a partially circular housing. The housing is provided with a slit extending therein for receiving a rotary cutter wheel.

The cutter wheel can be selectively shifted between an extended cutting position and a retracted position enclosed within the housing through the use of a push button component operating a latch release allowing shifting between these positions. The slide bar mounting the cutting wheel for shifting movement is itself held in a slot in the housing. The slide bar is releasably held allowing removal in cleaning of the cutting wheel. A substantially tangential grip is provided as the top of the housing.

While at least partially circumventing some of the hereinabove mentioned drawbacks associated with other conventional rotary-type cutters, the implement disclosed in U.S. Pat. No. 6,438,850 still suffers from major drawbacks. Indeed, the hand grip extending generally tangentially along the top of the circular housing does not allow an intended user to manipulate the cutter using a sturdy and suitable grip such as a power or palm grip wherein opposing fingers press that grip against the palm of the hand.

Failure to allow for such a palm-type grip results in an increased risk of slippage of the cutting implement particularly when the latter needs to be angled relative to the surface to be cut. Slippage of the cutting implement during use, in turn, leads an increased risk of injury to the user and/or spoilage of the product being cut and/or its immediate environment. Failure to allow for a palm-type grip also potentially leads to non-ergonomical handling of the cutting device which, in turn, potentially leads to overt and/or repetitive type of injuries.

Furthermore, the cutting implement disclosed in U.S. Pat. No. 6,438,850 fails to provide additional useful features such as a means for increasing the versatility of the cutting implement by selectively allowing and preventing rotation of the cutting blade.

Accordingly, there exists a need for an improved rotary-type cutting implement. It is therefore a general object of the present invention to provide an improved rotary-type cutting implement.

SUMMARY OF THE INVENTION

In accordance with the present invention, there is provided a cutting implement, the cutting implement being operable by a hand of an intended user, the hand having digits including a thumb extending from a palm, the cutting implement comprising: a substantially annular blade and a casing, the casing defining a handle, the handle defining a pair of substantially opposed handle end segments, the handle having a handle channel extending therethrough between the handle end segments, the handle channel defining a pair of corresponding opposed channel ends; the blade defining an inner arc segment extending through the handle channel and an integrally extending outer arc segment extending outwardly from the casing; the blade defining a blade rotation axis and being rotatably mounted within the handle channel for rotation relative thereto.

Preferably, the cutting implement further comprises a rotation restraining means extending between the blade and the casing for allowing the intended user to selectively restrain the rotation of the blade relative to the handle channel.

Conveniently, the cutting implement further comprises a guiding means extending between the blade and the casing for guiding the rotational movement of the blade relative to the handle channel and preventing translational relative movement therebetween.

Typically, the cutting implement further comprises the guiding means also acts as a friction reducing means for reducing the frictional force between the blade and the casing when the blade rotates relative to the handle channel.

Conveniently, the cutting implement further comprises a wiping means extending therefrom for wiping at least a portion of the blade as the blade rotates relative to the handle channel.

Typically, the cutting implement further comprises a casing sealing means extending therefrom for sealing the handle channel so as to prevent the entry of foreign objects therein.

Conveniently, the cutting implement further comprises a contact prevention means extending from the handle for preventing the hand from coming into contact with the outer arc segment when the hand grasps the handle.

In one embodiment of the invention, the contact prevention means includes a casing bridging section extending substantially diametrically between the handle end segments so that the casing has a substantially "D"-shaped configuration.

Typically, the handle has a circumferentially interrupted substantially annular configuration extending within a predetermined circumferential range between the handle end segments, the handle channel having a corresponding circumferentially interrupted substantially annular configuration.

Conveniently, the handle defines a radially innermost located handle inner edge and a radially outermost located handle outer edge, the blade defining a radially innermost located blade inner edge and a substantially opposed and radially outermost located blade outer edge, the handle inner edge being located radially inwardly relative to the blade inner edge and the handle outer edge being located radially outwardly relative to the blade outer edge.

In accordance with the present invention, there is also provided a cutting implement for cutting an object, the cutting implement comprising: an annular blade defining a blade aperture extending therethrough and an outer blade peripheral cutting edge, the cutting implement also including a handle covering a covered arc segment of the blade while allowing an outer arc segment of the blade to protrude therefrom, the covered arc segment being rotatably mounted within the handle The present invention also relates to a method for allowing an intended user having a hand to cut an object using a cutting implement, the cutting implement including an annular blade defining a blade aperture extending therethrough and an outer blade peripheral cutting edge, the cutting implement also including a handle covering a covered arc segment of the blade while allowing an outer arc segment of the blade to protrude therefrom, the covered arc segment being rotatably mounted within the handle, the method comprising: holding the covered arc segment using the handle; moving the blade peripheral cutting edge across at least a portion of the object.

Preferably, the covered arc segment is held by grasping the handle with at least a portion of the hand inserted in the blade aperture. Typically, handle is grasped using a palm grip.

In accordance with one aspect of the method, the blade peripheral cutting edge is moved across at least a portion of the object by rotating the covered arc segment relative to the handle.

In accordance with another aspect of the method, the blade peripheral cutting edge is moved across at least a portion of the object while maintaining the covered arc segment stationary relative to the handle.

Advantages of at least some of the proposed embodiments of the invention include that the proposed cutting implement allows for handling thereof in an ergonomical fashion through the use of a power or palm-type grip wherein opposing fingers at least partially encircle the cutting blade for added stability and maneuverability while pressing the handle against the hand of the intended user.

Also, the proposed invention allows for ergonomic positioning of the thumb of the intended user so that the latter may contribute to the manipulation of the device in an ergonomic fashion.

Furthermore, the proposed device allows for increased versatility thereof compared to conventional rotary-type cutters. In at least some embodiments thereof, the proposed implement provides a selective rotation restraining mechanism allowing selective restraining of the rotation of the rotary cutting blade thereby increasing the versatility of the cutting implement. The cutting implement may hence be used as a rotary knife allowing free rotation of the cutting blade, as a rotating knife allowing restrictive rotation of the cutting blade or as a mezzaluna-type or slicing-type knife having a blade in a fixed relationship relative to the handle. Furthermore, switching between operational modes is allowed through a set of quick and ergonomical steps without requiring manual dexterity or without requiring that the cutting operation be impeded.

Still furthermore, the proposed invention provides a means for wiping the cutting blade during use thereof so as to prevent entrainment of soiling objects within the casing housing of the cutting blade. The wiping means also allows the cutting edge of the blade to remain free of debris during the cutting operation so as to increase the efficiency thereof.

Also, the proposed invention provides a means for guiding the rotation of the cutting blade during use thereof so as to prevent wobbling of the cutting blade and so as to reduce wear thereon. An increased cutting pressure may hence be exerted on the cutting implement against leading to improved cutting efficiency and to the possibility of making deeper and more accurate cuts.

Furthermore, the proposed invention also provides a friction-reducing means for reducing the friction between the cutting blade and the housing during rotation of the cutting blade, again improving the ergonomics of the implement while reducing wear on its components.

Also, the proposed invention is provided with a blade contact prevention means for preventing the hand of the intended user from coming into contact with the exposed segment of the blade and/or the product being cut when the device is used.

Still furthermore, the proposed invention is optionally further provided with a means for protecting the exposed blade against dulling when not in use. The proposed cutting implement is still further designed so that its components most subjected to wear, including the blade, may be easily replaced through a set of quick and ergonomic steps. The proposed cutting implement allows replacement and/or maintenance of its components with reduced risks of damaging or otherwise altering adjacent components and without the need for special tooling or manual dexterity.

Also, the proposed invention is designed so as to be aesthetically pleasing and relatively easy to clean again through a set of quick and ergonomic steps without requiring special cleaning implements or manual dexterity. In addition, the exterior surface of the proposed invention is typically smooth and preferably uninterrupted so that it prevents accumulation of food residues thereon. Furthermore, the material of the outer surface is typically compatible with food and of a material approved for food use.

Furthermore, the proposed device is designed so as to be manufacturable through conventional forms of manufacture using conventional materials and components so as to provide a cutting implement that will be economically feasible, long-lasting and relatively trouble-free in operation.

In one embodiment, the present invention provides for a cutting implement comprising: a housing comprising at least two halves hingedly attached to one another to form a generally semicircular housing, the housing has an internal cavity leading to at least two openings when the halves are in a closed position, the housing has an aperture and an external surface, the aperture and at least a portion of the external surface adapted to form a grip for a user to manually guide the rotational movement of a blade to allow for cutting; and the blade is generally circular with a sharp peripheral edge and at least one aperture, and the aperture is adapted to form a contact surface along its internal edge, at least a portion of the blade is situated within the cavity of the housing, and at least a portion of blade extends from the opening of the housing to expose at least a portion of the sharp edge of the blade, wherein a user applies a downward pressure upon the housing to allow the blade to roll within the cavity of the housing and the sharp peripheral edge of the blade to cut.

In another embodiment, the present invention relates to a cutting implement comprising: a generally semicircular housing having an internal cavity leading to at least two openings, the housing comprising an aperture and an external surface, the aperture and at least a portion of the external surface adapted for functioning as a grip, the grip is designed to allow a user to manually guide the rotational movement of a blade to allow for cutting, the housing further comprising a thumb rest, the thumb rest being situated adjacent to the grip; at least one guide roller and at least one protrusion situated within the housing; and the blade being generally circular with a sharp peripheral edge and at least one aperture, the aperture adapted to form a contact surface along its internal edge, at least a portion of said blade is situated within the cavity of the housing, at least a portion of blade extends from the opening of the housing to expose at least a portion of the sharp edge of the blade, the internal edge of the blade contacts the guide roller to allow the blade to roll within the internal cavity of the housing, and the protrusion secures the blade within the internal cavity of said housing, wherein a user applies a downward pressure upon the housing to allow the blade to roll within the cavity of the housing and the sharp peripheral edge of the blade to cut.

Other advantages of the present invention will become apparent from a careful reading of the detailed description provided herein, within appropriate reference to the accompanying drawings.

BRIEF DESCRIPTION OF THE DRAWINGS

Various embodiments of the present invention will now be disclosed, by way of example, in reference to the following drawings in which:

FIG. 5, in a partial perspective view with sections taken out, illustrates part of a casing section of a cutting implement in accordance with an embodiment of the present invention having guiding pins extending therefrom;

FIG. 5A, in a partial perspective view with sections taken out, illustrates part of a blade and of a guiding component used for guiding the blade;

FIG. 5B illustrates part of a blade and another alternative embodiment of a guiding component for guiding the latter;

FIG. 5C, illustrates part of a blade and yet another alternative embodiment of a guiding components for guiding the latter;

FIG. 5D, illustrates part of a blade and yet still another alternative embodiment of a guiding components for guiding the latter;

FIG. 6A, in a partial exploded view with sections taken out, illustrates an alternative embodiment of a guiding mechanism for guiding a cutting blade within a blade receiving channel, only a section of the cutting blade and of the blade receiving channel being shown;

FIG. 6B, in a partial perspective view with sections taken out, illustrates a section of a cutting blade having yet an alternative embodiment of part of a blade guiding mechanism about to be attached thereto;

FIG. 7, in a partial exploded view with sections taken out, illustrates yet another embodiment of a guiding component about to be mounted to part of a casing;

FIG. 8A, in a partial exploded view with sections taken out, illustrates part of a cutting blade about to be inserted within an alternative embodiment of a guiding component part of a guiding mechanism;

FIG. 8B, in a partial exploded view with sections taken out, illustrates part of a cutting blade about to be inserted within an alternative embodiment of a guiding component part of a guiding mechanism;

FIG. 8C, in a partial exploded view with sections taken out, illustrates part of a cutting blade about to be inserted within an alternative embodiment of a guiding component part of a guiding mechanism;

DETAILED DESCRIPTION

Figure 1:
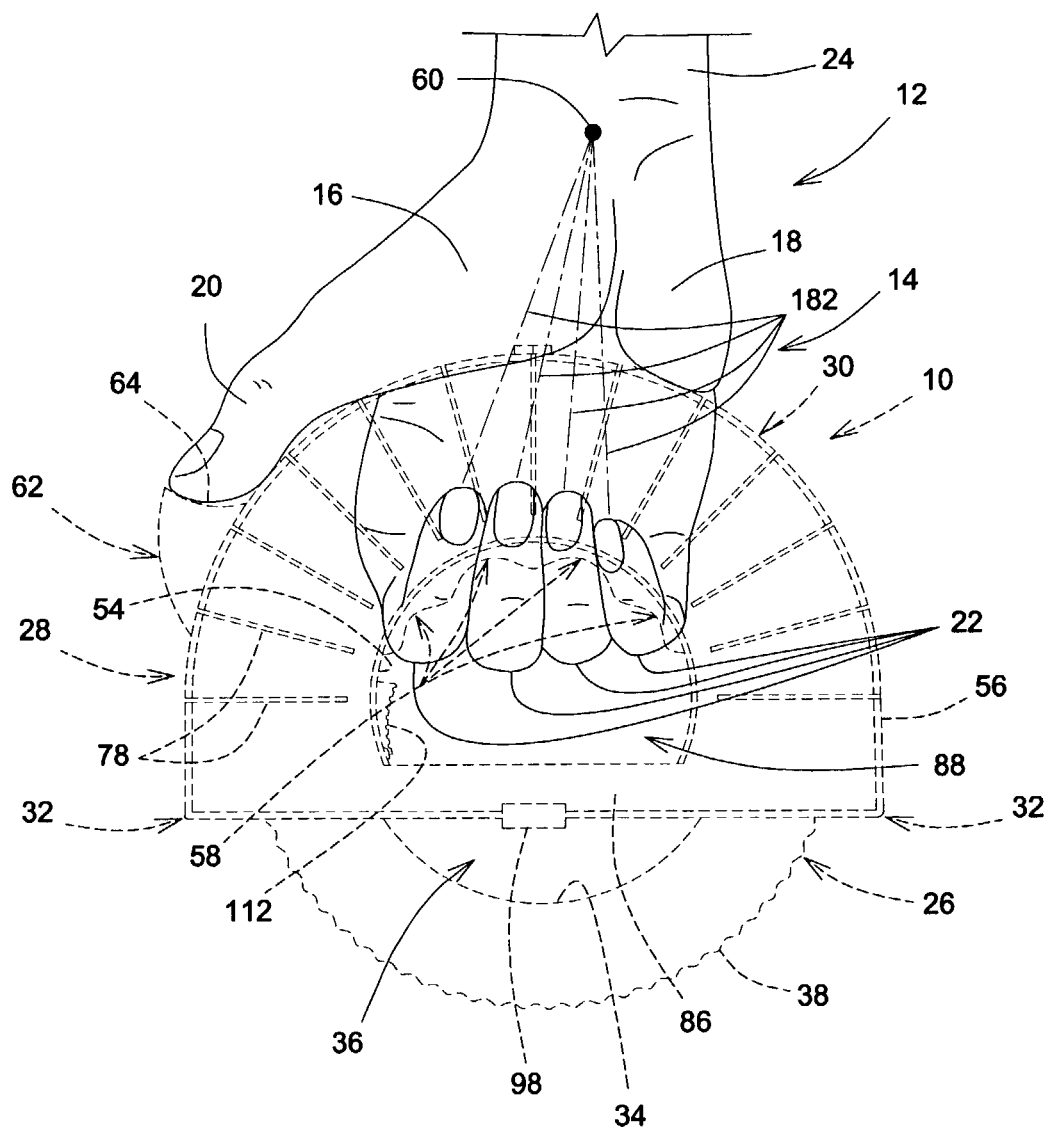
FIG. 1, in a partial front elevational view with sections taken out, illustrates a cutting implement in accordance with an embodiment of the present invention, the cutting implement is shown in phantom lines being held by a hand of an intended user shown in full lines.

Referring to FIG. 1, there is shown a cutting implement 10 in accordance with an embodiment of the present invention being manipulated by a hand 12 of an intended user. The hand 12, illustrated by way of example, has a palm region 14 including thenar and hypothenar eminences 16, 18. The hand 12 also has digits including a thumb 20 and four opposing fingers 22. As shown more specifically in FIGS. 2a and 2b, the four opposing fingers 22 are typically flexible separately about respective metacarpophalangeal joints 180 as well as respective proximal and distal inter-phalangeal joints 70, 72.

In FIG. 1, the hand 12 is shown in full lines while the cutting implement 10 is shown in phantom lines to allow better visualization of the ergonomical relationship therebetween. Some of the features allowing for this ergonomical relationship between the hand 12 and the cutting implement 10 will be hereinafter disclosed in greater details.

Figure 2B:
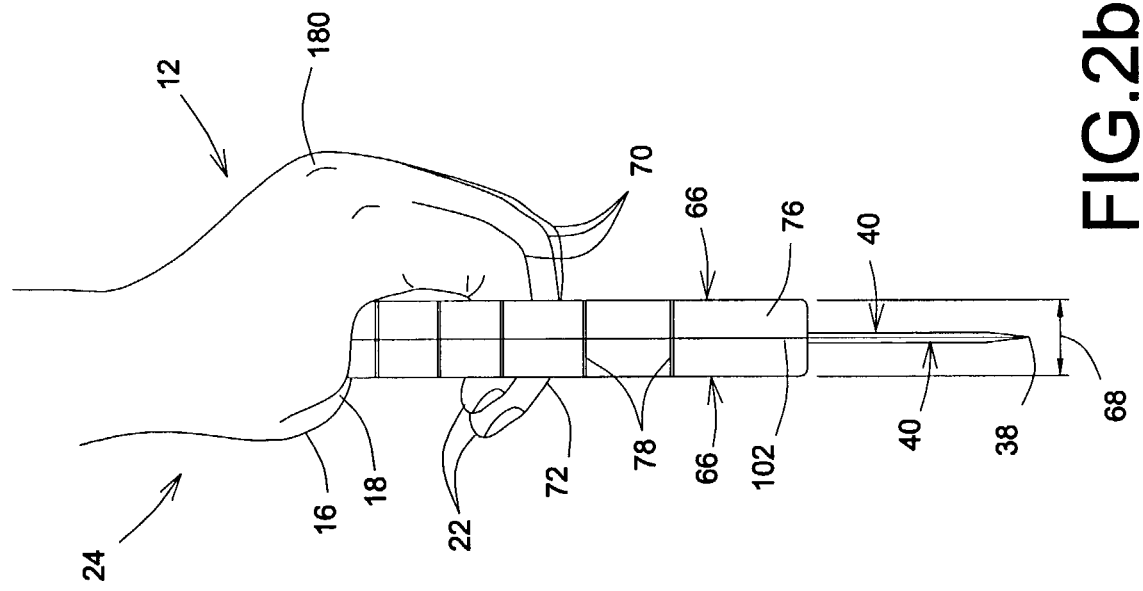
FIG. 2B, in a left side elevational view with sections taken out, illustrates the cutting implement shown in FIG. 1 being grasped by the hand of an intended user.
Figure 2A:
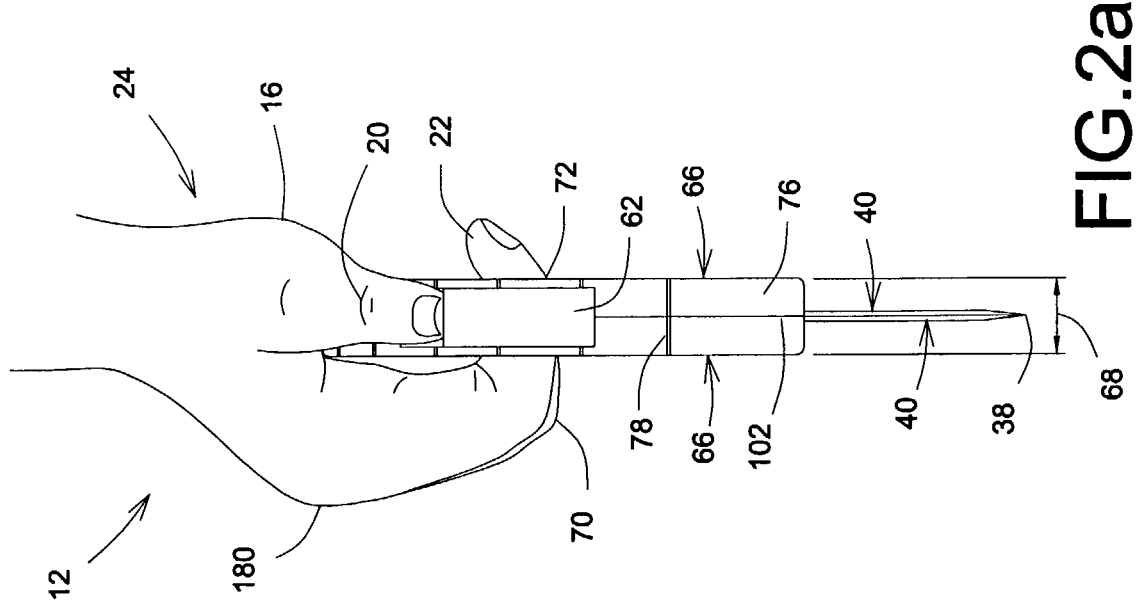
FIG. 2A, in a right side elevational view with sections taken out, illustrates the cutting implement shown in FIG. 1 being grasped by the hand of an intended user.

FIGS. 1, 2a and 2b illustrate the hand 12 manipulating the cutting implement 10 using a power or palm grip wherein the opposing fingers 22 maintain part of the cutting implement 10 against the palm 14. The opposing fingers 22 are flexed and the wrist 24 is in ulnar deviation and extended. It should however be understood that the cutting implement 10 could be used in other contexts and using other types of power or precision grips including a three-point chuck, a lateral grip, a tip pinch or any other suitable type of grip without departing from the scope of the present invention.

The cutting implement 10 includes a substantially annular blade 26 and a casing or housing 28. The casing 28 defines a handle 30. In turn, the handle 30 defines a pair of substantially opposed handle end segments 32.

Figure 4:
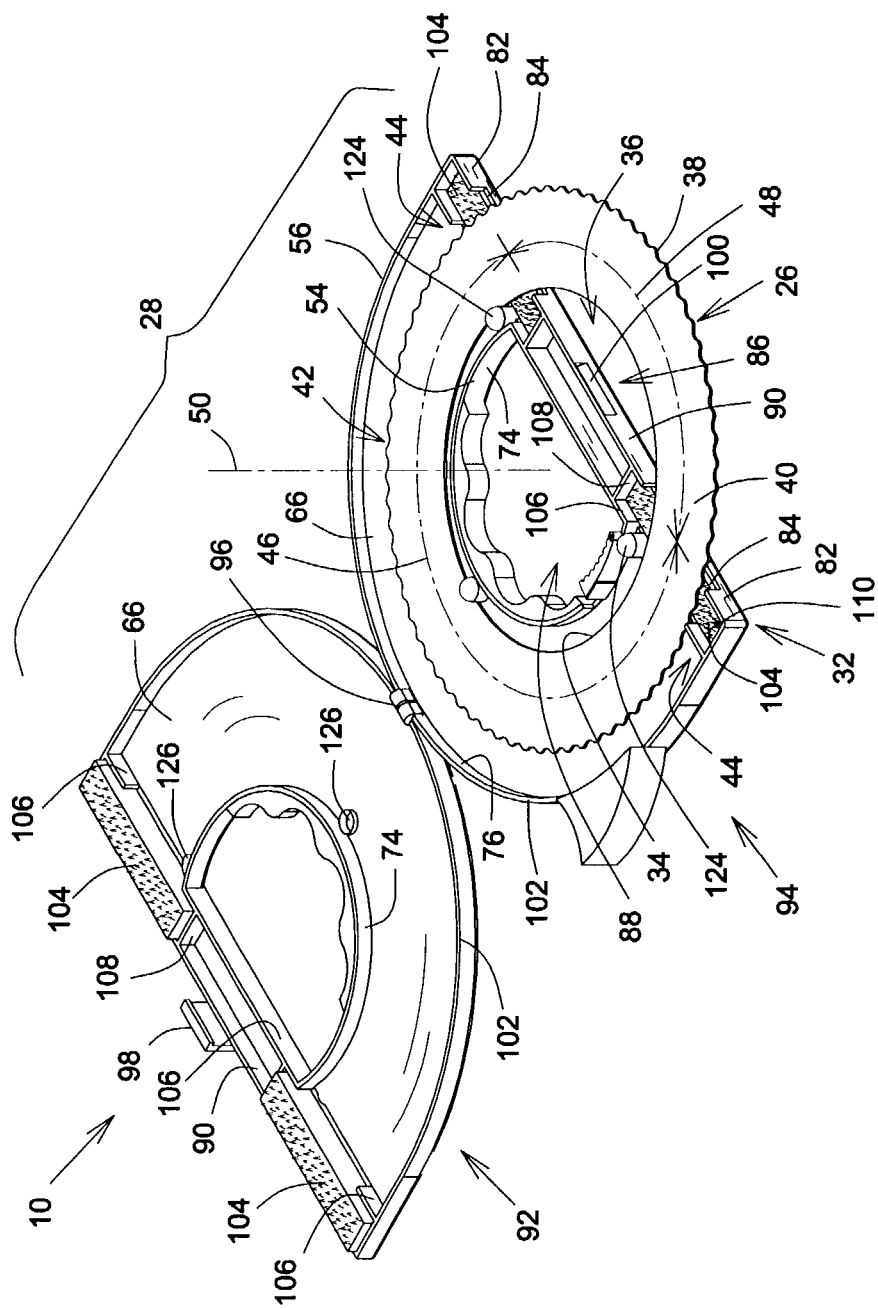
FIG. 4, in a perspective view, illustrates a cutting implement in accordance with an embodiment of the present invention, the cutting implement being shown with its casing in an opened configuration allowing visualization of some of the internal components of the cutting implement.

As illustrated more specifically in FIG. 4, the annular blade 26 typically defines a blade inner edge 34 delimiting a blade aperture 36. Although the blade inner edge 34 and the blade aperture 36 are shown throughout the figures as having respectively a substantially annular and a substantially disc-shape configuration, it should be understood that both the blade inner edge 34 and the blade aperture 36 could have other suitable configurations without departing from the scope of the present invention.

The blade 26 also defines a peripheral cutting or outer edge 38. The blade outer edge 38 is typically given cutting characteristics such as a relatively thin cross-section and is typically made out of a suitable hardened material allowing for cutting therewith. Throughout most of the figures, the blade outer edge 38 is shown with serrations formed thereon. It should however be understood that the blade outer edge 38 could be provided without serrations and could present other configurations and cutting characteristics without departing from the scope of the present invention.

Figure 12:
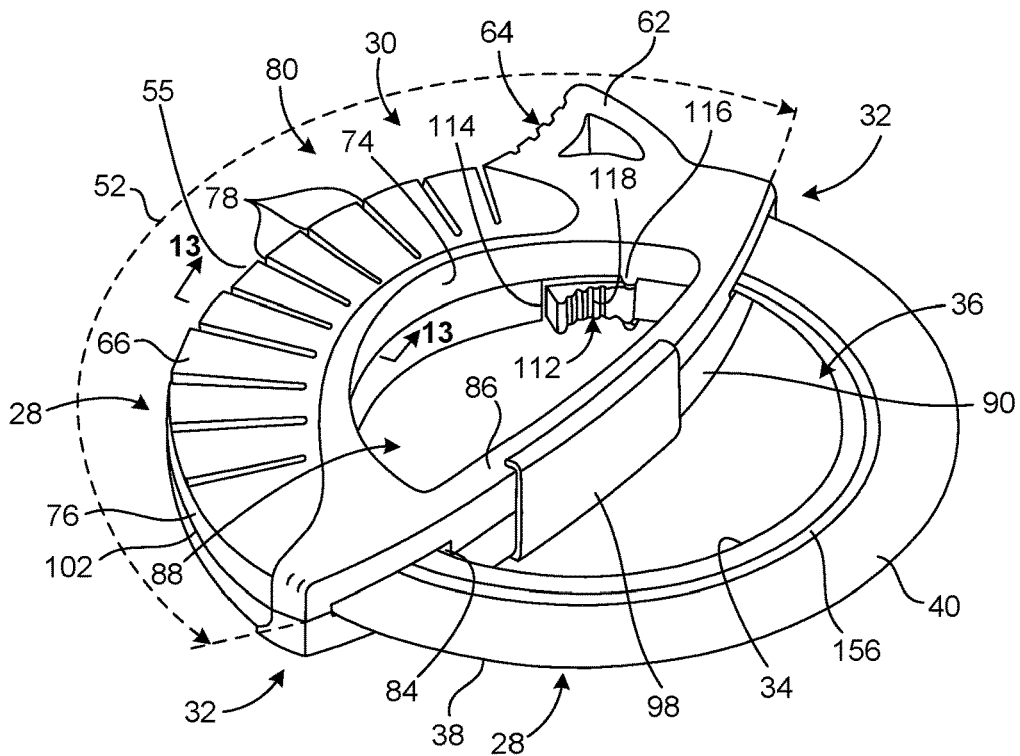
FIG. 12, in a perspective view, illustrates a cutting implement having a casing design in accordance with an alternative embodiment of the present invention.
Figure 13:
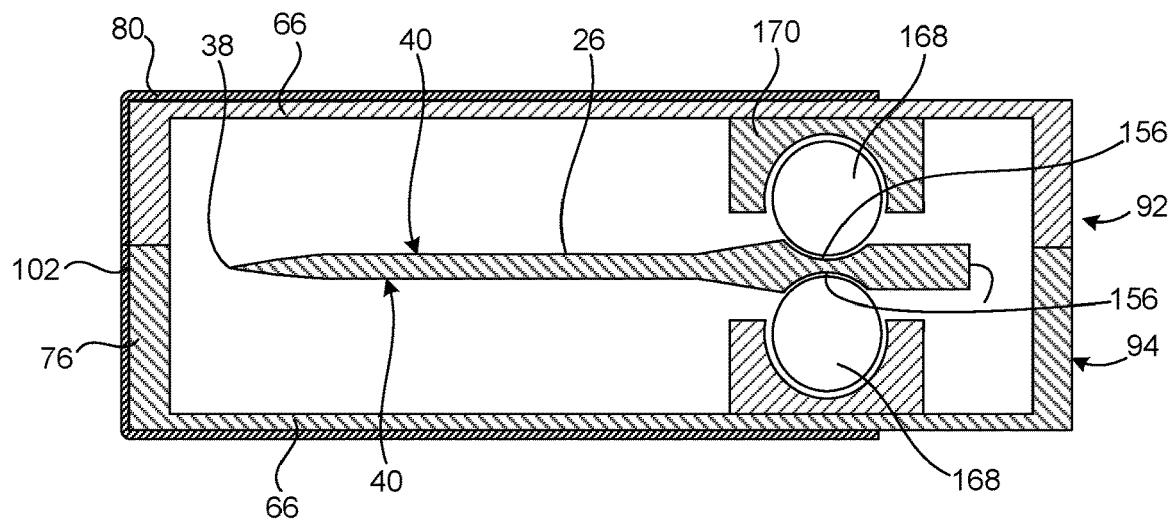
FIG. 13, in a transversal cross-sectional view taken along arrows 13-13 of FIG. 12, illustrates yet another embodiment of a blade guiding mechanism.

The blade 26 also defines a pair of opposed blade lateral surfaces 40 (only one of which is shown in FIG. 4). Typically, the blade lateral surfaces 40 have a substantially flat configuration. FIGS. 8b, 12 and 13 illustrate at least one of the blade lateral surfaces 40 having at least one groove formed therein.

It should be understood that although the blade lateral surfaces 40 are shown throughout the figures as having a substantially flat configuration, the blade lateral surfaces 40 could have other configurations and cross-sectional profiles including grooves, ridges and other topographical characteristics without departing from the scope of the present invention. Also, the blade lateral surfaces 40 could be provided with apertures (not shown) extending therethrough in order to decrease the overall weight of the blade 26 or for other purposes without departing from the scope of the present invention.

The handle 30 has a handle channel 42 extending therethrough between the handle end segments 32. The handle channel 42 defines a pair of corresponding opposed channel ends 44.

The blade 26 defines an inner blade covered or inner arc segment 46 extending through the handle channel 42 and an integrally extending blade uncovered or outer arc segment 48 extending outwardly from the casing 28. The blade 26 also defines a blade rotation axis 50 and is rotatably mounted within the handle channel 42 for rotation relative thereto.

Figure 3:
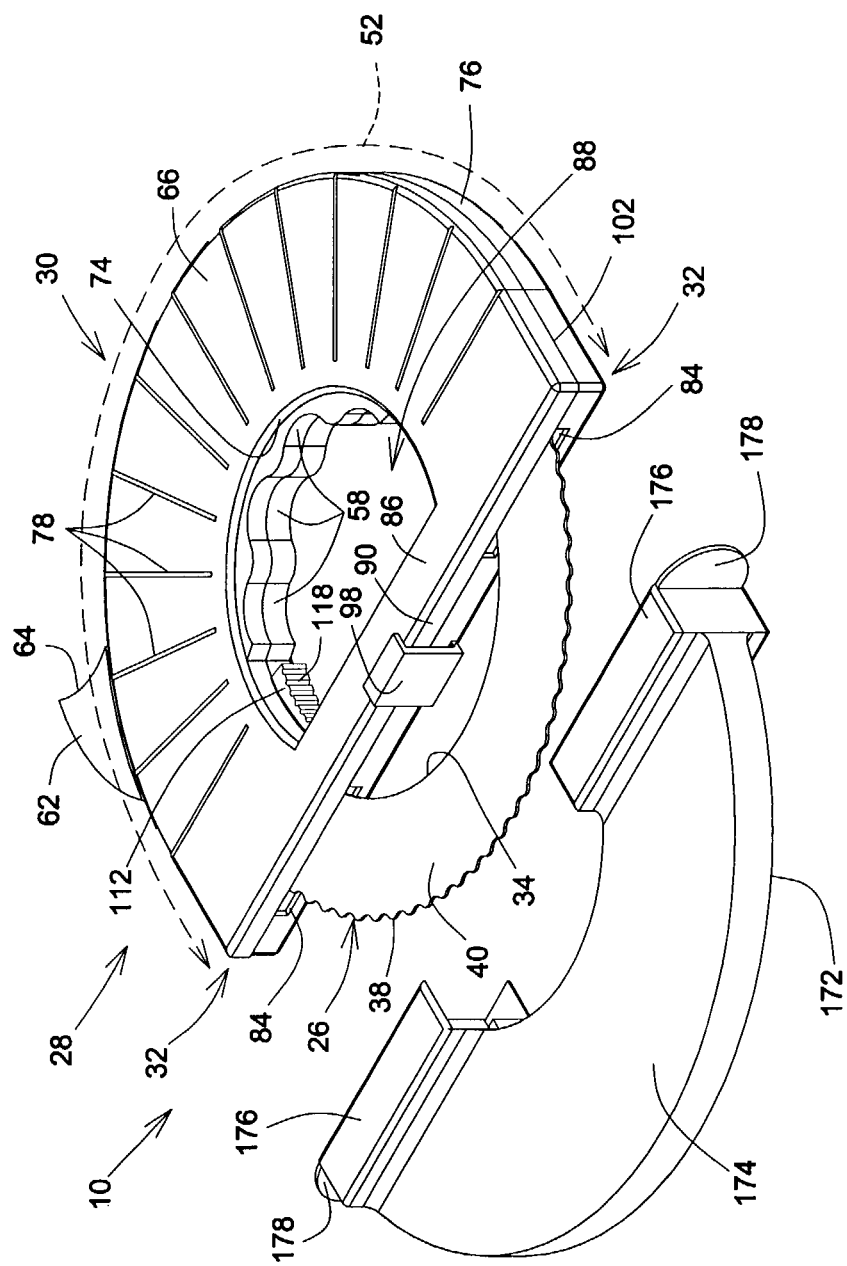
FIG. 3, in a perspective view, illustrates a cutting implement in accordance with an embodiment of the present invention, the cutting implement being shown with a blade cover about to be mounted thereon.

As shown more specifically in FIGS. 3 and 12, the handle 30 typically has a circumferentially interrupted substantially annular configuration extending within a predetermined circumferential range 52 between the handle end segments 32. As shown more specifically in FIGS. 4 through 6a, 7, 9 and 14, the handle channel 42 also typically has a corresponding circumferentially interrupted substantially annular configuration.

It should be understood that, although throughout the figures the handle 30 is shown as having substantially the configuration of an annular segment, the handle 30 could have other suitable configurations without departing from the scope of the present invention. In other words, the configuration of the outer surfaces of the handle 30 may differ from that of the handle channel 42 for aesthetic, structural, manufacturing or other purposes without departing from the scope of the present invention.

As illustrated more specifically in FIG. 1, the handle 30 typically defines a radially innermost located handle inner edge 54 and a radially outermost located handle outer edge 56. The handle inner edge 54 is located radially inwardly relative to the blade inner edge 34 and the handle outer edge 56 is located radially outwardly relative to the blade outer edge 38. Therefore, the casing 28 defines a casing outer peripheral edge 55 (seen in FIG. 12).

The handle inner edge 54 typically has a substantially arcuate and concave configuration. Also, typically, the handle inner edge 54 is provided with at least one and preferably a set of indentations 58 formed therein for receiving at least some and preferably all of the opposing fingers 22.

It should be understood that the handle inner edge 54 could assume other configurations such as a substantially rectilinear or a substantially convex configuration without departing from the scope of the present invention. As shown more specifically in FIG. 1, the handle inner edge 54 is typically given a suitable configuration so that when the four opposing fingers 22 are flexed separately at the metacarpophalangeal joint 180 and proximal inter-phalangeal joints 70, their respective flexed finger axes 182 converge ergonomically towards the scaphoid tubercle 60.

Typically, the handle outer edge 56 has a substantially arcuate and convex configuration. It should be understood that the handle outer edge 56 could have other configurations such as a substantially rectilinear, concave or other suitable configurations without departing from the scope of the present invention.

The handle outer edge 56 is typically configured and sized for substantially fittingly abutting against the palm 14 of the hand 12 when the latter grips the handle 30 through the use of a palm-type grip. Typically, although by no means exclusively, the handle outer edge 56 is designed so as to substantially conform to the substantially concave and arcuate configuration of the corresponding abutting surfaces of the thenar and hypothenar eminences 16, 18 when the hand 12 holds the cutting implement 10 using a palm or power grip. The radius of the handle inner and outer edges 54, 56 when the latter have a substantially arcuate configuration is typically sized so as to accommodate the characteristics of a hand 12 having average anthropometric values for selected market groups so that the handle 30 will provide a comfortable and ergonomical grip for these groups.

The handle outer edge 56 is preferably provided with a thumb rest 62 extending therefrom for supporting the thumb 20. The thumb rest 62 defines a thumb abutment surface 64. When the handle outer edge 56 has a substantially arcuate configuration curving in a first curve direction, the thumb abutment surface 64 typically also has a generally arcuate configuration but curving in a second curve direction substantially opposite to the first curve direction.

The thumb abutment surface 64 is typically configured and sized for substantially fittingly accommodating the distal pulp of the thumb 20. The thumb rest 62 is also typically positioned so that when the handle 30 is grasped substantially about the apex thereof an anthropometrically average thumb 20 in a substantially stretched state and abutting against handle outer edge 56 will reach the thumb abutment surface 64.

The handle 30 includes a pair of handle lateral walls 66 extending in a substantially radial direction between the handle outer and inner edges 56, 54. As shown more specifically in FIGS. 2a and 2b, the handle lateral walls 66 are typically in a spaced apart relationship relative to each other so as to define a lateral wall spacing 68 therebetween.

Each handle lateral wall 66 typically has a substantially flat configuration. Also, typically, the handle lateral walls 66 extend in a substantially parallel relationship relative to each other. It should however be understood that the handle lateral walls 66 could assume other configurations without departing from the scope of the present invention.

For example, the handle lateral walls 66 could have an outwardly concave or convex configuration, could each have separate or distinct configurations, could be in a convergent or divergent relationship relative to each other or could assume any other suitable configuration. Typically, the lateral walls spacing 68 is adjusted so as to facilitate ergonomical grasping through a palm grip with the proximal and distal interphalangeal joints 70, 72 located in a substantially outward and proximal relationship relative to the handle lateral walls 66 on each side of the latter.

In alternative embodiments of the invention (not shown) the handle outer and inner edges 56, 58 may be defined solely by the corresponding outer and inner edges of the lateral walls 66 without any wall segments extending therebetween adjacent the handle outer and inner edges 56, 58. In the embodiments shown throughout the figures, the handle also includes an inner abutment wall 74 extending between the handle lateral walls 66 substantially adjacent the handle inner edge 58 for abuttingly contacting at least one of the opposing fingers 22. When the inner abutment wall 74 is present, the latter is typically provided with the indentations 58 formed integrally therein or superposed thereon.

In the embodiments shown throughout the figures, the handle 30 is also provided with an outer abutment wall 76 extending between the handle lateral wall 66 substantially adjacent or in register with the handle outer edge 56 for abuttingly contacting the palm 14 of the hand 12. When the outer abutment wall 76 is present, the thumb rest 62 typically extends integrally therefrom or is superposed thereon.

As illustrated more specifically in FIGS. 1, 2a and 2b, the handle 30 is optionally further provided with handle grooves 78 formed on the outer surface of the handle lateral walls 66 and/or the outer abutment wall 76. The handle grooves 78 typically extend in a generally radial direction.

As illustrated more specifically in FIG. 12, the handle 30 may be provided with a differently textured palm contacting segment 80 for facilitating ergonomical grasping thereof. In such instances, the handle grooves 78 may be formed in the palm contacting segment 80. The handle grooves 78 typically improve the overall structural rigidity of the handle 30 while increasing the frictional coefficient of the latter as well as providing a pleasing visual effect.

When both an inner and an outer abutment wall 74, 76 are present, the handle lateral wall 66 together with the handle inner and outer abutment walls 74, 76 substantially encompass at least a portion of the inner arc segment 46. As shown more specifically in FIG. 4, the cutting implement 10 typically further includes an end wall 82 extending across the handle channel 42 adjacent each of the channel ends 44.

Each end wall 82 extends between corresponding portions of the inner and outer abutment walls 74, 76 and between corresponding segments of the handle lateral wall 66. Each end wall 82 is provided with a corresponding end wall aperture or slot 84 extending therethrough for allowing through passage therein of the blade 26.

In the embodiments shown throughout the figures, the cutting implement 10 further includes a casing bridging section 86 extending substantially diametrically between the handle end segments 32 giving the casing 28 a substantially D-shaped configuration. The casing bridging section 86 provides a contact prevention means for preventing the hand 12 from coming into contact with the outer arc segment 48 when the hand 12 grasps the handle 30. The handle bridging section 86 also increases the structural rigidity of the casing 28.

The handle bridging section 86 further allows for a more cognitively ergonomic visual assessment of the handle 30 since it provides a visual reference structure facilitating insertion of part of the hand 12 through the casing aperture 88 defined between the handle 30 and the casing bridging section 86. The casing bridging section 86 also facilitates storing of the cutting implement 10 since it facilitates hooking of the latter to conventional anchoring hooks with reduced risks of having the cutting implement fall off the latter. Furthermore, the casing bridging section 86 also acts as a cutting depth limiting means by abuttingly limiting the depth of the cut made by the blade 26 during use thereof.

Typically, the handle bridging section 86 extends integrally into the end walls 82. Alternatively, the handle bridging section 86 may be releasably attached to the handle 30. The handle bridging section 86 defines a bridging section outer wall 90 located generally opposite the handle 30. In the embodiment shown in FIGS. 1 through 11, the bridging section outer wall 90 has a substantially rectilinear configuration. In the embodiment shown in FIGS. 12 through 14, the bridging section outer wall 90 has a substantially convex configuration.

Also, in the embodiment shown in FIGS. 1 through 11, the sides of the handle 30 and of the bridging section 86 are such that the inner arc segment 46 spans across substantially ⅔ of the overall diameter of the blade 26. In the embodiment shown in FIGS. 12 through 14, the size and configuration of both the handle 30 and the bridging section 86 are such that the inner arc segment 46 spans across less than ½ of the overall diameter of the blade 26.

It should however be understood that the circumferential span of the inner and outer arc segments 46, 48 as well as the general configuration of both the handle 30 and the bridging section 86 could vary without departing from the scope of the present invention.

As shown more specifically in FIG. 4, the casing 28 is typically made out of two casing pieces 92, 94. The casing pieces 92, 94 are selectively at least partially detachable and attachable to and from each other for respectively allowing and preventing lateral access to the handle channel 42 from a direction substantially perpendicular relative to the radial orientation of the handle 30. In the embodiments shown throughout the figures, the handle pieces 92, 94 are pivotally attached together by a hinge 96 about their respective apexes.

The handle pieces 92, 94 are pivotally attached so as to be pivotable relative to each other between a handle open configuration shown in FIG. 4 and a handle closed configuration shown in FIGS. 1 through 3, 12 and 13 for respectively allowing and preventing lateral access to the handle channel 42 from a direction substantially perpendicular relative to the radial orientation of the handle 30.

Typically, the cutting implement 10 further includes a handle piece locking means or mechanism for selectively and reversibly locking the handle pieces 92, 94 in the handle closed configuration. The handle piece locking means may take any suitable form.

For example, the handle piece locking means shown throughout the figures and illustrated in greater details in FIG. 4 includes a generally L-shaped locking tongue 98 extending from a portion of the bridging section outer wall 90 formed in the casing piece 92 and a corresponding locking groove 100 formed in a portion of the bridging section outer wall 90 of the casing piece 94. The locking tongue 98 is resiliently deformable and configured for selective insertion of a portion thereof within the locking groove 100 when the casing pieces 92, 94 are pivoted together towards their closed configuration.

The locking tongue 98, being made of a substantially resilient material, may be selectively released from the locking groove 100 to allow pivoting of the casing pieces 92, 94 towards their opened configuration. Typically, the casing pieces 92, 94 are separable about a separation line 102 extending along the inner and outer abutment walls 74, 76, the end walls 82 and the casing bridging section 86.

Typically, the casing 28 is provided with a wiping means positioned substantially adjacent at least one and preferably both of the end walls 82 for wiping at least a portion and preferably most of the blade 26 as the latter rotates relative to the handle channel 42. Typically, the wiping means includes at least one and preferably two blade contacting components 104 mounted within the handle channel 42 or adjacent thereto so as to be in contact with the blade 26 as the latter rotates relative to the handle channel 42. The blade contacting components 104 are typically located adjacent each of the channel ends 44 for contacting the blade lateral surfaces 40 as the blade 26 rotates.

The casing 28 is typically further provided with a casing sealing means positioned substantially adjacent at least one and preferably both the casing end walls apertures 84 for sealing the casing 28 so as to prevent the entry of foreign objects through the end wall apertures 84. Typically, the casing sealing means includes having both blade contacting components 104 extend across the respective blade-to-peripheral edge spacing spanning between the blade 26 and the peripheral edges of the end wall apertures 84. The blade contacting components 104 hence typically preclude entrainment of foreign objects into the handle channel 42 by the blade 26 as the latter rotates relative to the handle channel 42.

Preferably, each of the blade contacting components 104 is made out of substantially resiliently deformable material. Also, preferably, each blade contacting component 104 is mounted so as to be in a resiliently compressed state when contacting the blade 26. Although the blade contacting components 104 are shown as having generally parallelepiped configurations, it should be understood that the blade contacting components 104 could have other configurations without departing from the scope of the present invention.

Typically, an interrupted bridging section inner wall 106 extends in an inwardly spaced relationship relative to the bridging section outer wall 90. Also, typically, bridging section spacing walls 108 extend between the bridging section inner and outer walls 106, 90 in a substantially perpendicular relationship relative thereto. The bridging section inner and outer walls 106, 90 and the bridging section spacing walls 108 typically define corresponding contacting component receiving compartments 110 for receiving the blade contacting components 104.

The cutting implement 10 typically further includes a rotation restraining means extending between the blade 26 and the casing 28 for allowing an intended user to selectively restrain the rotation of the blade 26 relative to the handle channel 42. The rotation restraining means may be used for selectively preventing the rotation of the blade 26 or for restraining the free rotation thereof so that the rotation of the blade 26 is slowed down or only allowed to rotate when a predetermined rotational force applied thereto exceeds a predetermined threshold level.

The rotation restraining means may take any suitable form. Typically, in the embodiments shown throughout the figures and illustrated more specifically in FIG. 11, the rotation restraining means includes a restraining component 112 movably attached to the casing 28 for movement between a non-restraining configuration illustrated in full lines wherein the restraining component 112 is spaced relative to the blade 26 and a restraining configuration illustrated in phantom lines wherein the restraining component 112 frictionally contacts the blade 26.

Typically, a restraining component aperture 114 extends through the inner abutment wall 74 for receiving the restraining component 112 and allowing movement thereof between the non-restraining and restraining configurations. Also, typically, the restraining component 112 is pivotally attached by a restraining component hinge 116 to a segment of the inner abutment wall 74 adjacent the restraining component aperture 114 allowing for pivotal movement between the contacting and non-contacting configurations.

Furthermore, the restraining component 112 typically defines a restraining component digit contacting surface 118 for contacting at least one of the opposing fingers 22 and a substantially opposed restraining component blade contacting surface 120 for contacting the blade 26. The restraining component blade contacting surface 120 may optionally be provided with a friction-enhancing means attached thereto for enhancing the frictional force between the blade 26 and the restraining component 112 when the latter is in the restraining configuration. The friction-enhancing means may take any suitable form such as a friction-enhancing block 122 made out of friction-enhancing material and typically releasably attached to the restraining component blade contacting surface 120 for allowing easy replacement thereof.

Typically, the restraining component 112 is positioned generally in register with the thumb rest 62 so as to allow easy and ergonomical access thereto by the index finger, part of the opposing fingers 22 of the hand 12. It should however be understood that the restraining component could be located at other locations without departing from the scope of the present invention.

Typically, the cutting implement 10 further includes a guiding means extending between the blade 26 and the casing 28 for guiding the rotational movement of the blade 26 relative to the handle channel 42. Optionally, the guiding means may also act as a friction reducing means for reducing the frictional force between the blade 26 and the casing 28 when the blade 26 rotates relative to the handle channel 42.

Various types of guiding means may be used. FIGS. 4 through 6 illustrate various embodiments wherein the guiding means includes at least two and preferably three guiding components 124 extending from the casing 28. The guiding components 124 are positioned for contacting the blade inner edge 34 about distinct locations so as to prevent translational relative displacement between the blade 26 and the handle channel 42.

Typically, a main guiding component 124' is positioned adjacent the apex of the handle inner edge 34 and an auxiliary guiding component 124 is positioned adjacent each of the channel ends 44. Also, typically, the main and auxiliary guiding components 124', 124 are positioned between the handle and blade inner edges 54, 34. Furthermore, the main and auxiliary guiding components 124', 124 typically extend between the handle lateral walls 56. Optionally, guiding components sleeves 126 extend from the inner surface of one of the handle lateral walls 66 for receiving the tip of corresponding guiding components 124 extending from the inner surface of the handle lateral wall 66 when the casing pieces 92, 94 are in the closed configuration.

In the embodiment shown in FIG. 4, each guiding component 124 has a generally cylindrical configuration and is substantially fixedly attached to outer surface of a corresponding handle lateral wall 66. The outer surface of the guiding components 124 may be coated or otherwise provided with a friction-reducing texture.

In the embodiment shown in FIG. 5A, the guiding component 124 includes a guiding pin 128 extending substantially perpendicularly from the inner surface of one of the handle lateral wall 66 and a guiding sleeve 130 rotatably mounted on the guiding pin 128. The guiding sleeve 130 defines a guiding sleeve outer surface for contacting the blade inner edge 34.

In the embodiment shown in FIG. 5B, an inner ball-bearing ring 132 is mounted between the guiding pin 128 and the guiding sleeve 130. In the embodiment shown in FIG. 5C, an outer ball-bearing ring 134 is mounted on the guiding sleeve outer surface 130 for contacting the blade inner edge 34.

In the embodiment shown in FIG. 5D, a guiding block 136 is mounted on the guiding pin 128. The guiding block 136 defines a guiding block outer surface provided with a guiding block groove 138 formed therein for slideably receiving the blade inner edge 34. Although the guiding block 136 is shown as having a substantially triangular cross-sectional configuration, and the guiding block groove 138 is shown as being formed in one of the guiding block apexes, it should be understood that the guiding block 136 and the guiding block groove 138 could have other configurations and locations respectively without departing from the scope of the present invention.

In the embodiments shown in FIGS. 6a and 6b, the guiding sleeve outer surface is provided with sleeve gear teeth 140 extending therefrom. The blade inner edge 34 is provided with complementary blade gear teeth 142 extending therefrom for operationally engaging the sleeve gear teeth 140. In the embodiment shown in FIG. 6a, the blade gear teeth 142 are formed integrally in the blade inner edge 34.

In the embodiment shown in FIG. 6b, the blade includes a blade lining strip 144 positionable over the blade inner edge 34. The blade lining strip 144 is provided with the blade gear teeth 142. The blade lining strip 144 is typically releasably attached to the blade inner edge 34 so as to allow easy replacement thereof in the event that the blade gear teeth 142 become worn out.

In the embodiments shown in FIGS. 7 and 8a through 8c, the guiding means includes a guiding rail 146 extending from the casing 28. The guiding rail 146 is positioned for contacting the blade inner edge 34 so as to prevent translational relative displacement between the blade 26 and the handle channel 42.

In the embodiment shown in FIG. 7, the guiding rail has a circumferentially interrupted substantially annular general configuration and a substantially U-shaped cross-sectional configuration for slidably and substantially fittingly receiving the blade inner edge 34. Typically, the guiding rail 146 is positioned adjacent the handle inner abutment wall 74.

As illustrated more specifically in FIGS. 8a through 8c, the guiding rail 146 typically defines a pair of guiding rail legs 148 maintained in a spaced apart relationship relative to each other by a guiding rail spacing leg 150. In the embodiment shown in FIG. 6a, at least one and preferably both guiding rail main legs 148 are provided with a main leg outer groove 152 formed on the external surface thereof for improving the structural characteristics of the guiding rail main legs 148.

In the embodiment shown in FIG. 8b, at least one and preferably both guiding rail main legs 148 are provided with a guiding rail anchoring flange 154 extending therefrom in a direction leading generally towards the other guiding rail main leg 148. Correspondingly, at least a corresponding one and preferably both blade lateral surfaces 40 are provided with an annular anchoring groove 156 formed therein for slidably and substantially fittingly receiving the guiding rail anchoring flanges 154.

It should be understood that although the guiding rail anchoring flanges 154 in the annular anchoring grooves 156 are shown as having a generally rectangular cross-sectional configuration, both the guiding rail anchoring flanges 154 and the annular anchoring grooves 156 could have other cross-sectional configurations without departing from the scope of the present invention.

In the embodiment shown in FIG. 8c, at least one and preferably both of the blade lateral surfaces 40 are provided with a blade anchoring flange 158 extending substantially outwardly therefrom. The guiding rail 146 is configured and sized for slidably and substantially fittingly receiving the blade anchoring flanges 158. Typically, each blade lateral surface 40 has a substantially triangular blade flange 158 extending therefrom. The inner blade edge 34 hence has a substantially frusto-triangular configuration. The guiding rail main legs 148 taper towards each other in a direction leading away from the guiding rail spacing leg 150 so as to form a guiding rail 146 having a corresponding frusto-triangular configuration.

In the embodiments shown in FIGS. 9 and 12 through 14, the guiding means includes at least one and preferably a set of guiding components positioned for contacting at least one and preferably both of the blade lateral surfaces 40 so as to prevent translational relative displacement between the blade 26 and the handle channel 42.

Figure 9:
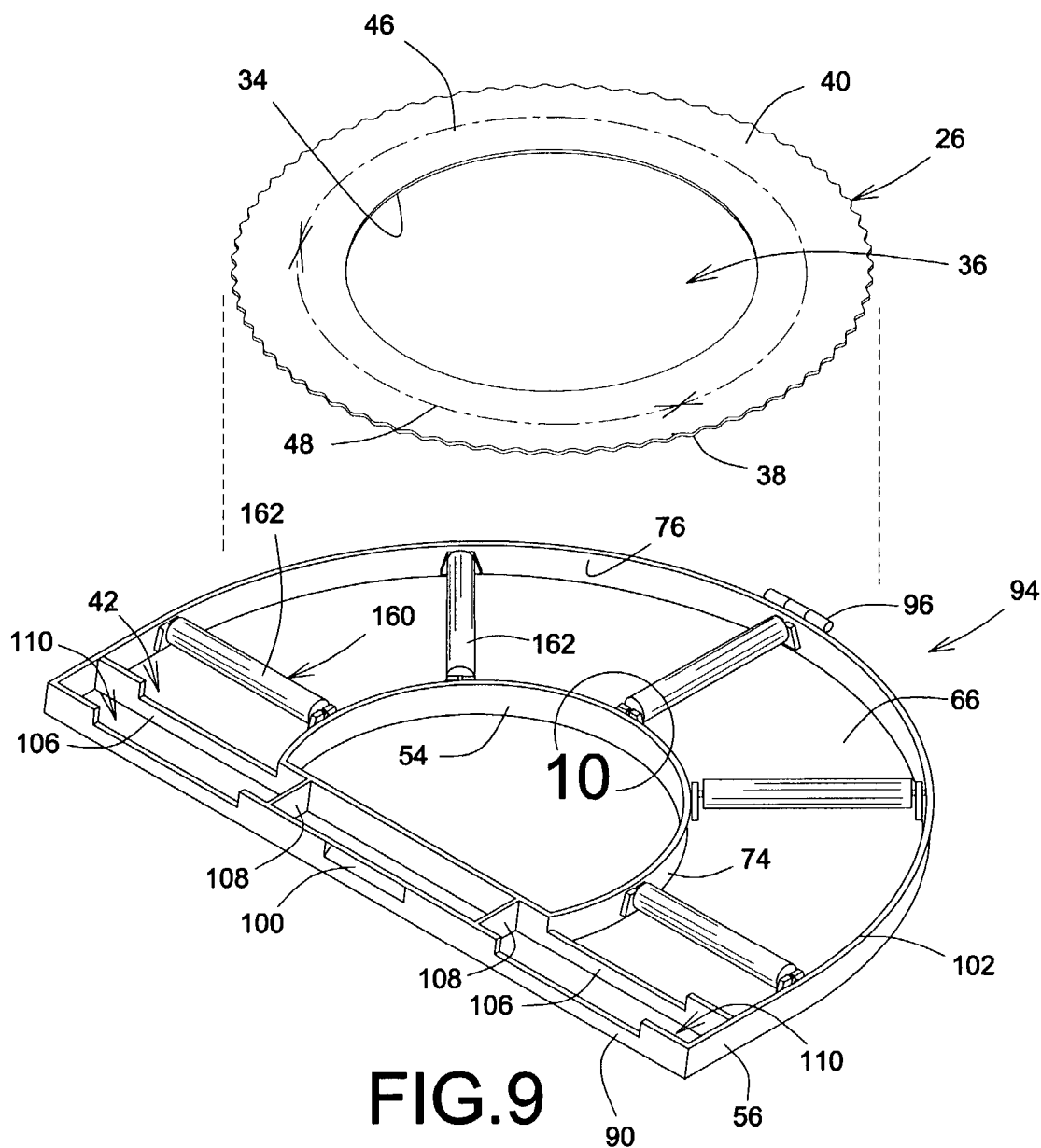
FIG. 9, in a partial exploded view with sections taken out, illustrates a cutting blade about to be mounted on an alternative embodiment of a guiding mechanism part of a cutting implement in accordance with an embodiment of the present invention.
Figure 10:
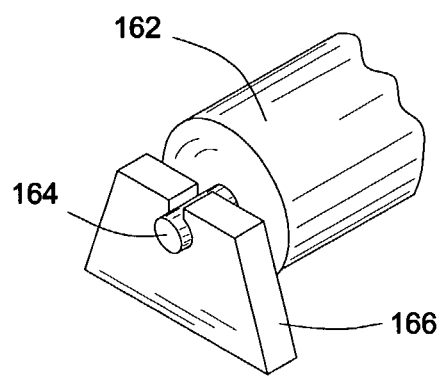
FIG. 10, in a partial perspective detailed view taken along arrows 10 of FIG. 9, illustrates a roller mounting structure part of the guiding mechanism shown partly in FIG. 9.
Figure 11:
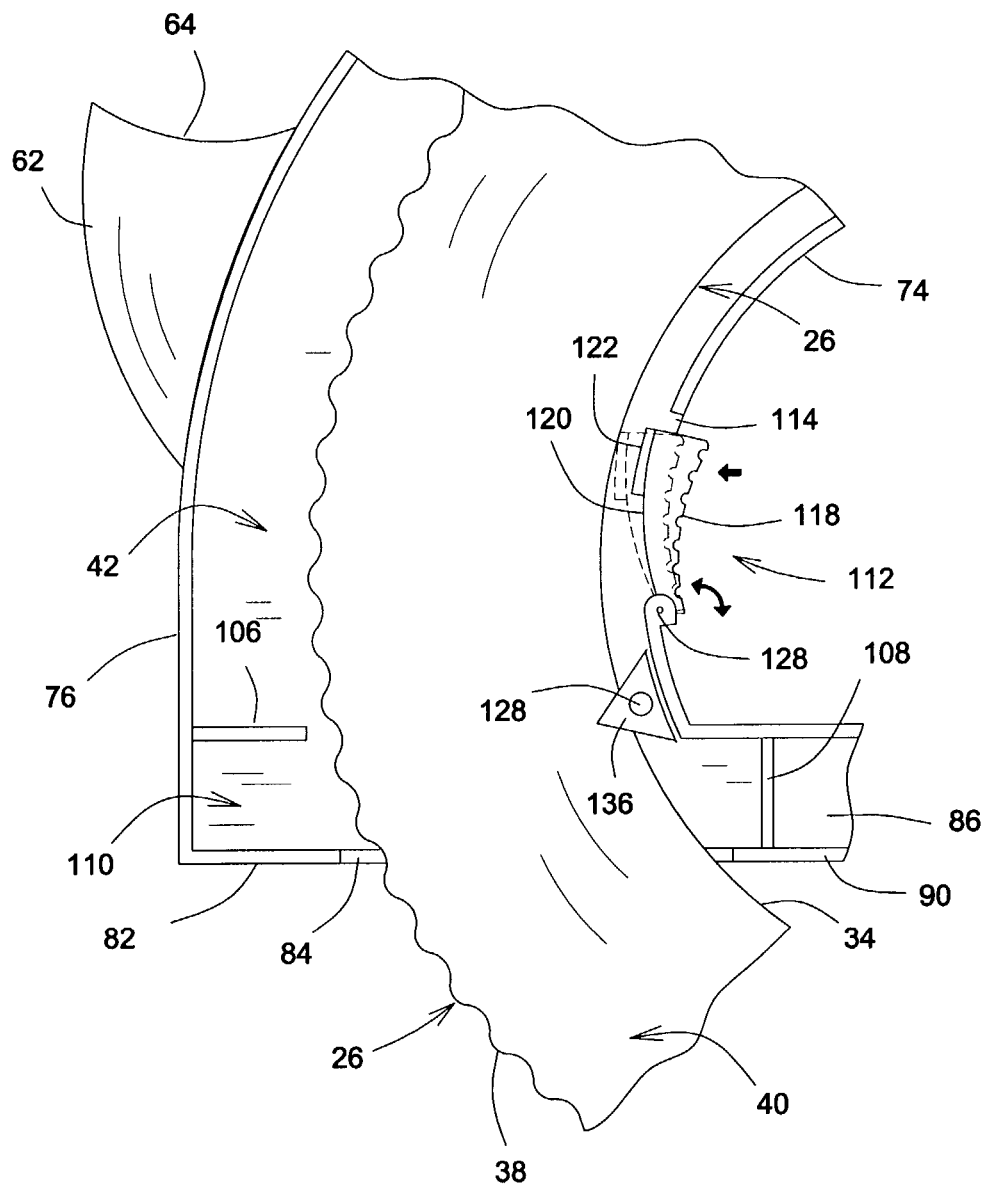
FIG. 11, in a partial front view with sections taken out, illustrates part of a rotation-restraining mechanism for restraining rotation of a cutting blade both part of a cutting implement in accordance with an embodiment of the present invention.

In the embodiments shown in FIGS. 9 and 10, the guiding means includes a set of lateral cylinder bearings 160 mounted on the handle 30 for contacting both blade lateral surfaces 40. Typically, each cylinder bearing 160 includes a substantially cylindrical bearing body 162 and a bearing axle 164 extending from opposed longitudinal ends thereof. The casing 28 is provided with corresponding bearing axles supporting components 166 extending typically from the inner surface of the handle lateral walls 66 at the handle inner and outer edges 54, 56 for rotatably supporting the bearing axles 164.

Figure 14:
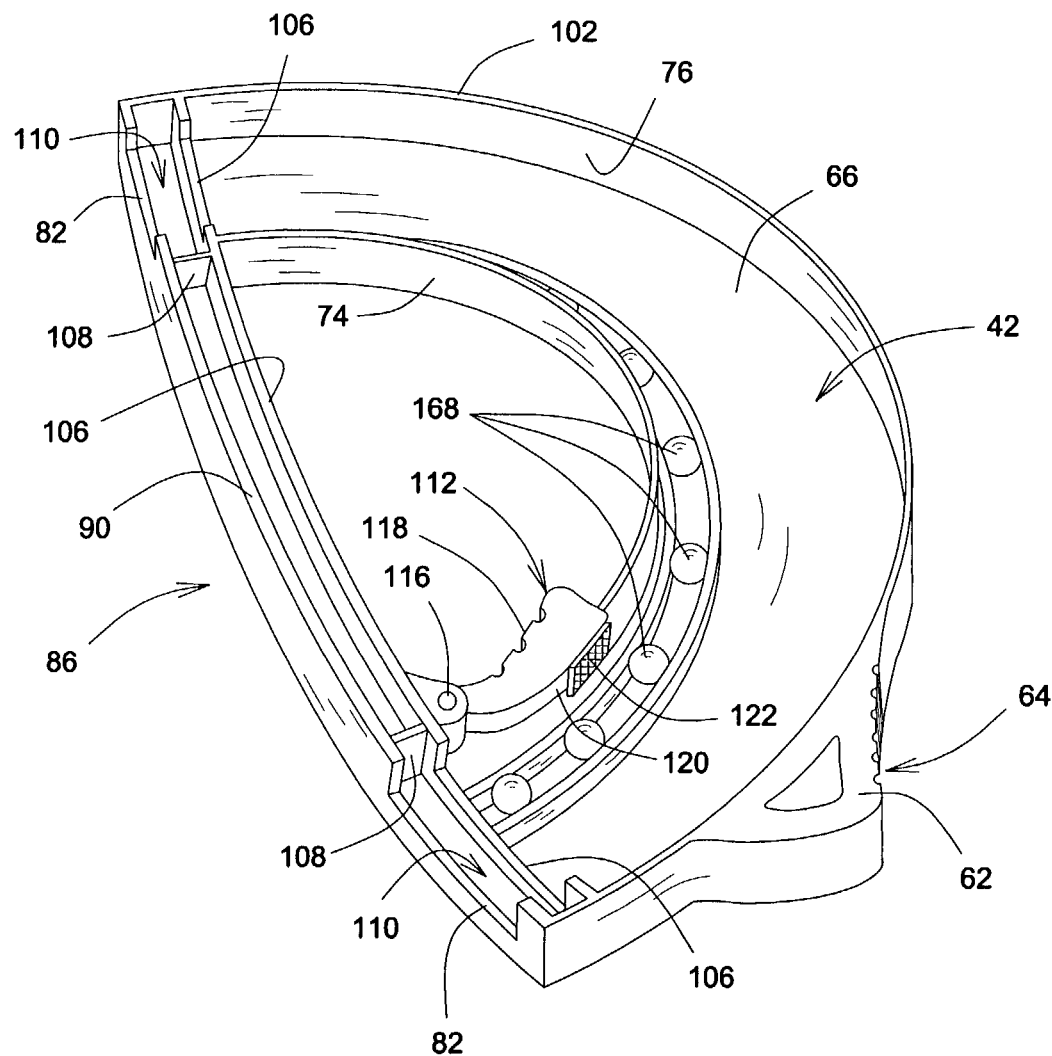
FIG. 14, in a partial perspective view with sections taken out, illustrates some of the interior components of the embodiment shown in FIGS. 12 and 13.

In the embodiment shown in FIGS. 12 through 14, the guiding means includes a set of lateral ball-bearings 168 mounted on the handle 30 for contacting at least one and preferably both blade lateral surfaces 40. The lateral ball-bearings are preferably mounted in corresponding lateral ball-bearing tracks 170 extending from the inner surface of the handle lateral walls 66.

As illustrated more specifically in FIG. 3, the cutting implement 10 optionally further includes a blade cover 172 releasably attachable to the casing 28 for selectively covering at least a portion and preferably most of the outer arc segment 48. Typically, the blade cover 172 includes a circumferentially interrupted substantially annular blade covering sleeve 174 provided with attachment flanges 176 at each end thereof. The attachment flanges 176 are configured and sized for substantially fittingly receiving and frictionally retaining a segment of the casing 28 insertable therein. Prehension tongues 178 typically extend laterally from the prehension sleeve for facilitating manipulation of the blade cover 172.

In use, the cutting implement 10 is preferably manipulated using the palm or power grip wherein the opposing fingers 22 extend at least partially through the casing aperture 88 to maintain the palm 14 against the palm abutment surface. Hence, typically, a covered or inner arc segment 46 is held by the hand 12 using the handle 30.

The present invention also relates to a method for allowing an intended user to cut an object using the hereinabove described cutting implement. The method involves holding the covered arc segment 46 using the handle 30 and moving the blade peripheral cutting edge 38 across at least a portion of the object. Typically, the covered arc segment 46 is held by grasping the handle 30 with at least a portion of the hand 12 inserted in the inner blade aperture 88. Also, preferably, the handle is grasped using a palm or power grip.

The peripheral cutting edge 38 may be moved across at least a portion of the object by rotating the covered arc segment 46 relative to the handle 30. Hence, the cutting implement 10 may be used as a rotary knife providing a cutting action substantially similar to that of a conventional pizza knife.

Alternatively, the blade peripheral cutting edge 38 may be moved across at least a portion of the object while maintaining the covered arc segment 46 stationary relative to the handle 30. In such instances, the rotation restraining means is typically used to prevent the rotation of the blade 26 relative to the handle channel 42. The cutting implement 10 may then be used as a slicing knife, a mezzaluna-type knife, a chopper or other type of knife wherein the blade is substantially stationary relative to the handle.

The rotation restraining means allows for the knife to be selectively used as a rotary or non-rotary knife. Also, the rotation of the blade 26 relative to the handle channel 42 may be partially restrained while still allowing rotation thereof against a resistive force when the latter reaches a predetermined threshold. In such situations, the rotation restraining component 112 is put into contact with the blade 26 so as to provide a frictional braking force without preventing rotation of the latter.

The casing 28 may be made out of any suitable material including a suitable food graded polymeric resin. The casing 28 is typically manufactured using a suitable manufacturing process such as a conventional injection molding or a thermoforming manufacturing process. The cutting blade 26 may be made out of any suitable material such as high carbon steel, high carbon stainless steel, stainless steel, titanium, ceramic, a polymeric resin or any other suitable material. The cutting blade 10 may be manufactured using a conventional manufacturing process such as being forged, stamped, sintered or otherwise manufactured. The blade contacting components 104 are typically manufactured using a suitable resilient material such as a suitable elastomeric or spongy material.

We claim:

1. A cutting device, said cutting device being operable by a hand of a user, said hand having digits including a thumb extending from a palm, said cutting device comprising:

a substantially annular blade and a casing, a portion of said blade being mounted within said casing such that, in an operative state, the blade is freely rotatable relative to said casing about a blade rotation axis, said casing defining a handle, said handle defining a pair of substantially opposed handle end segments, a radially innermost located handle inner edge and a radially outermost located handle outer edge, said blade defining a radially innermost located blade inner edge and a substantially opposed and radially outermost located blade outer cutting edge, said handle inner edge being located radially inwardly relative to said blade inner edge and said handle outer edge being located radially outwardly relative to said blade outer cutting edge, and said handle further having a handle channel bounded by said handle end segments, said handle inner edge and said handle outer edge, further wherein said handle channel includes a pair of opposed channel ends defined respectively by said handle end segments, said blade defining an inner arc segment extending through said handle channel and an integrally extending outer arc segment extending outwardly from said casing, said blade being rotatably mounted within said handle channel for rotation relative thereto, such that:

when said cutting device is in a first position and held by said hand holding said handle with at least said handle inner edge being partially pressed by some of said digits and said handle outer edge being pressed by said palm of said hand and said blade outer cutting edge of said outer arc segment is engaged with at least a portion of an object, then a pressure applied to said handle by said hand at least partially in a first direction toward said blade rotation axis and said object causes at least said inner arc segment of said blade to rotate about said blade rotation axis under said pressure within said handle channel of said casing and said blade outer cutting edge to roll across said at least said portion of said object in a second direction transverse to said first direction, wherein said roll allows said handle to move in said second direction and wherein said cutting device translates in said second direction from said first position to a second position.

2. A cutting device as recited in claim 1, wherein said handle has a circumferentially interrupted substantially semi-annular configuration extending within a predetermined circumferential range between said handle end segments, said handle channel having a corresponding circumferentially interrupted substantially semi-annular configuration.

3. A cutting device as recited in claim 1, wherein said handle inner edge has a substantially arcuate configuration.

4. A cutting device as recited in claim 1, wherein said handle inner edge is provided with at least one indentation formed therein for receiving at least one of said digits.

5. A cutting device as recited in claim 1, wherein said handle inner edge has a generally arcuate configuration and is provided with a set of indentations formed therein for receiving at least some of said digits.

6. A cutting device as recited in claim 1, wherein said handle outer edge has a substantially arcuate configuration.

7. A cutting device as recited in claim 1, wherein said handle outer edge is provided with a thumb rest extending therefrom for supporting said thumb.

8. A cutting device as recited in claim 1, wherein said handle outer edge has a substantially arcuate configuration curving in a first curve direction, said handle outer edge being provided with a thumb rest extending therefrom for supporting said thumb, said thumb rest defining a thumb abutment surface, said thumb abutment surface having a generally arcuate configuration curving in a second curve direction substantially opposite said first curve direction.

9. A cutting device as recited in claim 1, wherein said handle includes a pair of handle lateral walls extending in a substantially radial direction between said handle outer and inner edges, said handle lateral walls being in a spaced apart relationship relative to each other so as to further define the handle channel therebetween.

10. A cutting device as recited in claim 9, wherein each of said handle lateral walls has a substantially flat configuration and wherein said handle lateral walls extend in a substantially parallel relationship relative to each other.

11. A cutting device as recited in claim 9, wherein said handle also includes an inner abutment wall extending between said handle lateral walls substantially adjacent said handle inner edge for abuttingly contacting at least one of said digits.

12. A cutting device as recited in claim 11, wherein said inner abutment wall is provided with at least one indentation formed therein for receiving at least one of said digits.

13. A cutting device as recited in claim 9, wherein said handle also includes an outer abutment wall extending between said handle lateral walls substantially adjacent said handle outer edge for abuttingly contacting said palm of said hand.

14. A cutting device as recited in claim 13, wherein said outer abutment wall is provided with a thumb rest extending therefrom.

15. A cutting device as recited in claim 9, wherein said handle also includes both an inner and an outer abutment wall extending between said handle lateral walls respectively adjacent said handle inner and outer edges for abuttingly contacting respectively at least one of said digits and said palm, said inner and outer abutment walls and said handle lateral walls substantially protectively encompassing at least a portion of said inner arc segment.

16. A cutting device as recited in claim 15, further comprising two end walls extending across said handle channel adjacent each of said channel ends, each of said end walls extending between corresponding portions of said inner and outer abutment walls and between corresponding segments of said handle lateral walls, each of said end walls being provided with a corresponding end wall aperture extending therethrough for allowing passage therein of said blade.

17. A cutting device, said cutting device being operable by a hand of a user, said hand having digits including a thumb extending from a palm, said cutting device comprising:

a casing, said casing defining a casing outer peripheral edge, said casing having a casing aperture extending therethrough, said casing aperture being positioned so as to be spaced from said casing outer peripheral edge, wherein a portion of the casing is a handle suitable to be grasped by said hand with at least some of said digits extending at least partially through said casing aperture and said palm of said hand pressing against said handle of said cutting device, said casing also having a casing end wall aperture formed in said casing outer peripheral edge; and a substantially annular blade having a central blade aperture and an outer cutting edge, a portion of said blade being mounted within said casing such that, in an operative state, the blade is freely rotatable relative to said casing about a blade rotation axis, said blade defining an inner arc segment extending through said handle and an outer arc segment, including a portion of said outer cutting edge, extending outwardly from said casing through said casing end wall aperture, said blade rotation axis being located within said central blade aperture and said blade being rotatably attached to said casing so that said inner arc segment is rotatable through said handle, said blade being mounted so as to be rotatable within a channel of said handle about said blade rotation axis, such that:

when said cutting device is held in a first position by said hand holding said handle and said portion of said outer cutting edge of said outer arc segment is engaged with at least a portion of an object and a pressure is applied to said handle by said hand at least partially in a first direction toward said blade rotation axis and said object, said pressure further causes said blade to rotate under said pressure within said casing and said outer cutting edge of said outer arc segment to roll across said at least said portion of said object in a second direction transverse to said first direction, wherein said roll allows said handle to move in said second direction and wherein said cutting device translates in said second direction from said first position to a second position.

18. A cutting device as recited in claim 17, wherein said handle has a circumferentially interrupted substantially semi-annular configuration extending within a predetermined circumferential range between handle end segments of said handle, and said inner arc segment extending through said handle within the handle channel having a corresponding circumferentially interrupted substantially semi-annular configuration.

19. A cutting device as recited in claim 17, wherein said handle is provided with a thumb rest extending therefrom for supporting said thumb.

20. A cutting device as recited in claim 17, wherein a portion of said handle has a handle outer edge with a substantially arcuate configuration curving in a first curve direction, said handle outer edge being provided with a thumb rest extending therefrom for supporting said thumb, said thumb rest defining a thumb abutment surface, said thumb abutment surface having a generally arcuate configuration curving in a second curve direction substantially opposite said first curve direction.

* * * * *